(12) United States Patent
Lund

(10) Patent No.: US 8,505,233 B1
(45) Date of Patent: Aug. 13, 2013

(54) FISHING LURE COMPONENT ASSEMBLY

(76) Inventor: Robert Lund, Lake Crystal, MN (US)

( * ) Notice: Subject to any disclaimer, the term of this patent is extended or adjusted under 35 U.S.C. 154(b) by 365 days.

(21) Appl. No.: 13/049,014

(22) Filed: Mar. 16, 2011

(51) Int. Cl.
*A01K 85/00* (2006.01)

(52) U.S. Cl.
USPC ....... 43/42.32; 43/42.33; 43/42.34; 43/42.49; 43/44.87; 43/44.92

(58) Field of Classification Search
USPC ............ 43/42.32, 42.33, 42.34, 42.49, 44.87, 43/44.92, 44.95, 42, 43.1
See application file for complete search history.

(56) References Cited

U.S. PATENT DOCUMENTS

| | | | | | |
|---|---|---|---|---|---|
| 738,923 | A | * | 9/1903 | Lewis | 43/44.92 |
| 1,240,043 | A | * | 9/1917 | Maire | 43/44.9 |
| 2,633,659 | A | * | 4/1953 | Baum | 43/42.22 |
| 2,714,273 | A | * | 8/1955 | Torrance | 43/42.18 |
| 3,153,876 | A | * | 10/1964 | Multanen | 43/42.09 |
| 3,675,276 | A | * | 7/1972 | Nuse | 24/130 |
| 4,322,592 | A | | 3/1982 | Martin | |
| 4,981,245 | A | | 1/1991 | Sato | |
| 6,216,935 | B1 | | 4/2001 | Oussani, Jr. et al. | |
| 6,755,337 | B2 | | 6/2004 | Jairam et al. | |
| 6,942,136 | B2 | | 9/2005 | Tsai | |
| 7,299,958 | B2 | | 11/2007 | Adams et al. | |
| 8,196,338 | B2 | * | 6/2012 | Kavanaugh | 43/44.91 |
| 8,402,688 | B2 | * | 3/2013 | Choi | 43/42.31 |
| 2002/0020731 | A1 | | 2/2002 | Nagai | |
| 2004/0020963 | A1 | | 2/2004 | Sesek et al. | |
| 2006/0163310 | A1 | | 7/2006 | Adams et al. | |
| 2011/0296737 | A1 | * | 12/2011 | Peluso | 43/42.32 |

* cited by examiner

*Primary Examiner* — Christopher P Ellis

(57) ABSTRACT

A fishing lure component assembly includes a first panel and a second panel. Each of the first and second panels has a first side, a second side and a perimeter edge extending between associated ones of the first and second sides. The first side of each of the first and second panels comprises a light reflective material. The first and second panels each include an upper layer which includes the first side and a lower layer which includes the second side. The lower layer of the first panel comprises a first mating member and the lower layer of the second panel comprises a second mating member. The first and second mating members are configured to be removably coupled together with a leader positioned therebetween to releasably retain the first and second panels on the leader.

7 Claims, 4 Drawing Sheets

FISHING LURE COMPONENT ASSEMBLY

BACKGROUND OF THE DISCLOSURE

Field of the Disclosure

The disclosure relates to fish attraction devices and more particularly pertains to a new fish attraction device for altering a fishing lure with highly reflective material.

SUMMARY OF THE DISCLOSURE

An embodiment of the disclosure meets the needs presented above by generally comprising a first panel and a second panel. Each of the first and second panels has a first side, a second side and a perimeter edge extending between associated ones of the first and second sides. The first side of each of the first and second panels comprises a light reflective material. The first and second panels each include an upper layer which includes the first side and a lower layer which includes the second side. The lower layer of the first panel comprises a first mating member and the lower layer of the second panel comprises a second mating member. The first and second mating members are configured to be removably coupled together with a leader positioned therebetween to releasably retain the first and second panels on the leader. The first and second panels are coupled to each other on the leader such that the first and second panels rotate and reflect light as the leader is pulled through water.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
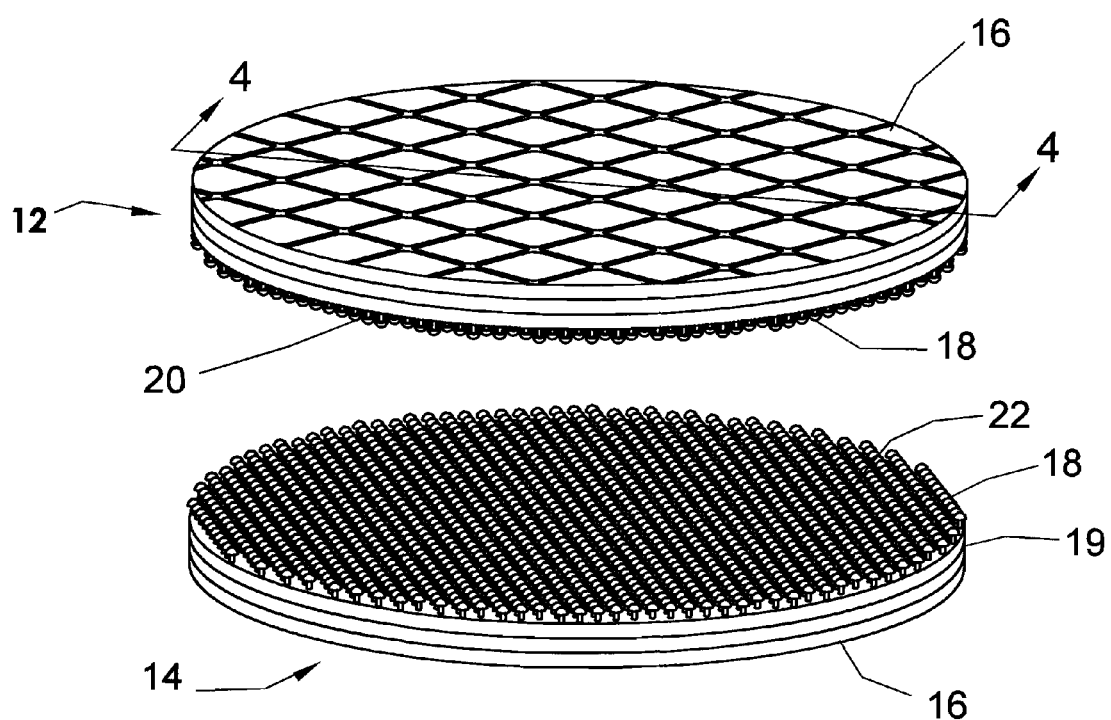
FIG. 1 is a top perspective view of a fishing lure component assembly according to an embodiment of the disclosure.
Figure 2:
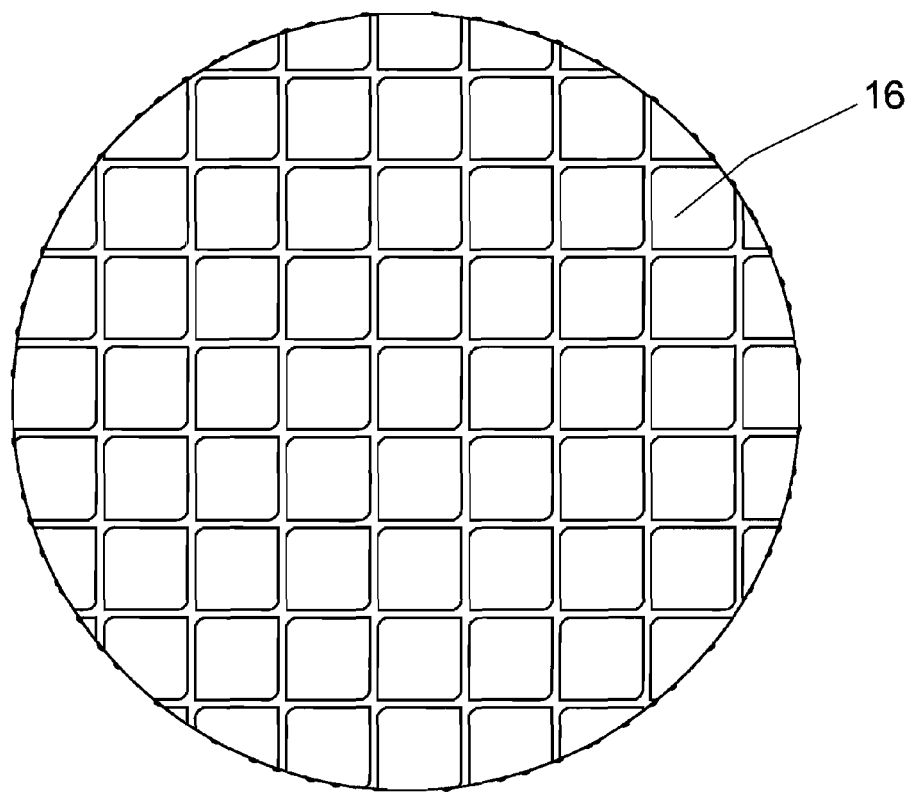
FIG. 2 is a bottom view of an embodiment of the disclosure.
Figure 3:
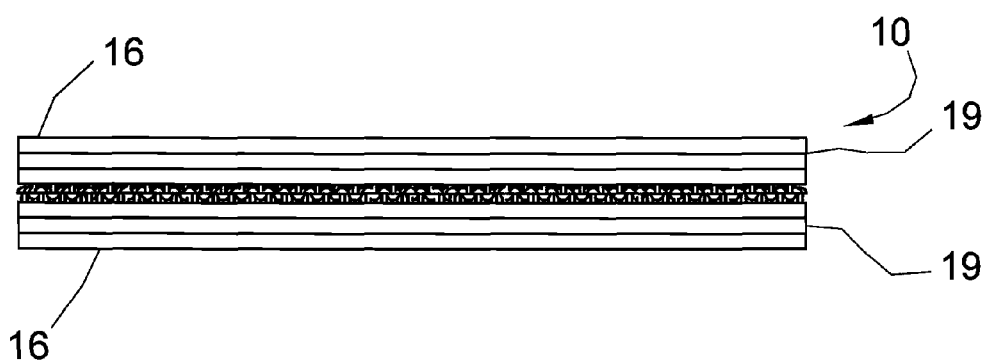
FIG. 3 is a side view of an embodiment of the disclosure.
Figure 4:
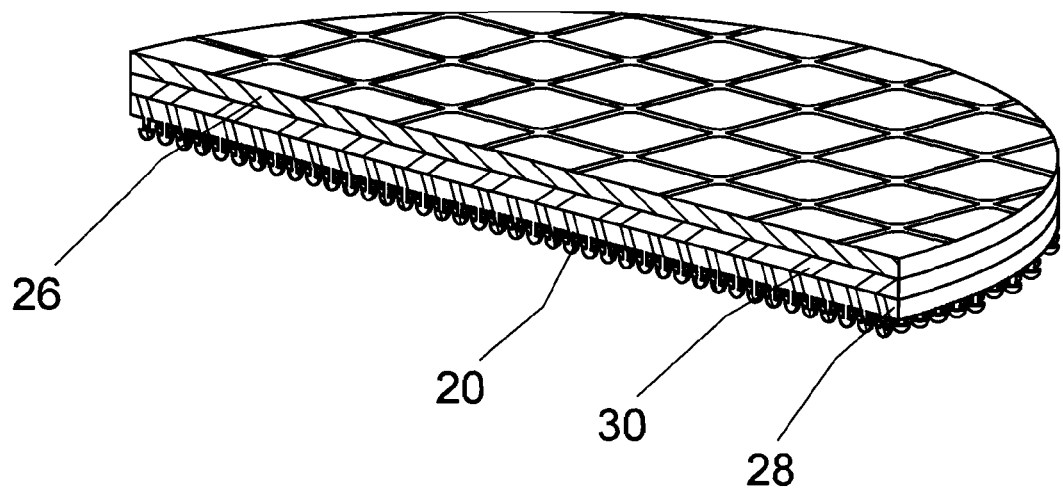
FIG. 4 is a cross-sectional view of an embodiment of the disclosure taken along line 4-4 of FIG. 1.
Figure 5:
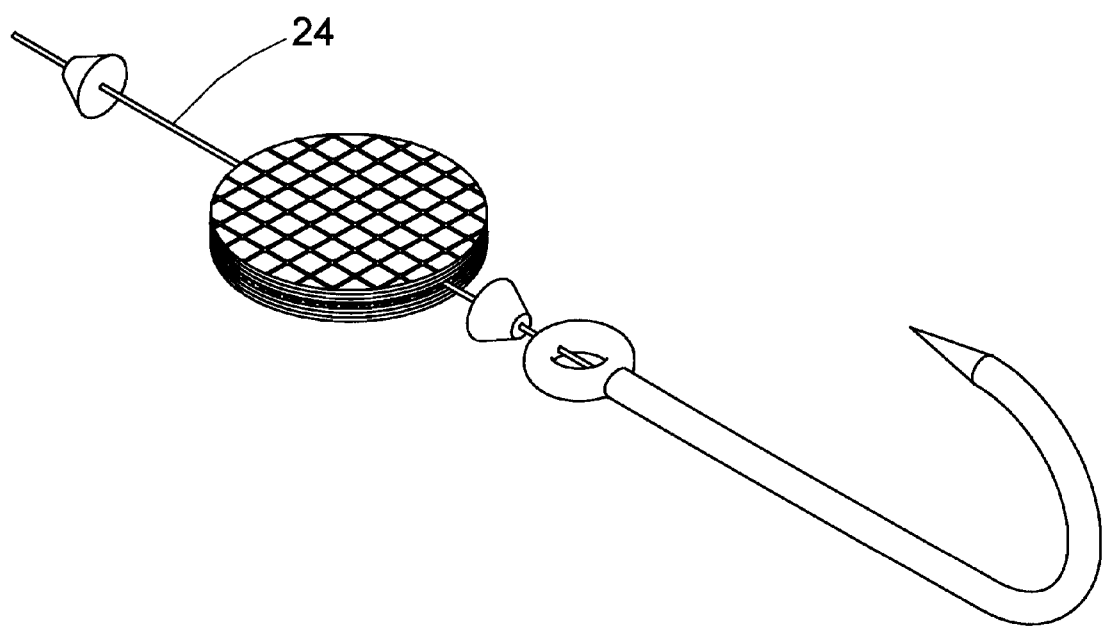
FIG. 5 is a top perspective view of an embodiment of the disclosure.

With reference now to the drawings, and in particular to FIGS. 1 through 5 thereof, a new fish attraction device embodying the principles and concepts of an embodiment of the disclosure and generally designated by the reference numeral 10 will be described.

As best illustrated in FIGS. 1 through 5, the fishing lure component assembly 10 generally comprises a first panel 12 and a second panel 14. Each of the first 12 and second 14 panels has a first side 16, a second side 18 and a perimeter edge 19 extending between associated ones of the first 16 and second 18 sides. The first side 16 of each of the first 12 and second 14 panels comprises a light reflective material. The second sides 18 are mating members 20, 22 configured to be releasably attached to each other. This will allow the second sides 18 to be attached to each other with a fishing leader 24 of a lure between the first 12 and second 14 panels. This will secure the first 12 and second 14 panels to the lure to act as an attractant to fish while fishing.

The first 12 and second 14 panels may be of a unitary structure, or they may be comprised of a plurality of layers. The first 12 and second 14 panels may comprise an upper layer 26 which includes the first side 16 and a lower layer 28 that includes the second side 18. The upper layer 26 of the first 12 and second 14 panels may each comprise a conventional reflective tape. Examples of this type of tape are sold by 3M, 3M Center, St. Paul, Minn. under the tradenames Diamond Grade Flexible Prismatic and Scotchlite Reflective Tape.

The lower layer 28 of the first panel 12 comprises a first mating member 20 and the lower layer 28 of the second panel 14 comprises a second mating member 22. The first 20 and second 22 mating members are configured to be removably coupled together with the leader 24 positioned between the first 12 and second 14 panels to releasably retain the first 12 and second 14 panels on the leader 24. The second sides 18 of the first 12 and second 14 panels may entirely comprise a corresponding one of the first 12 or second 14 mating members such that the second sides 18 are joinable along their perimeter edges 19. While conventional hook and loop material may be used, another material which may be used is 3M Dual Lock, again supplied by 3M, which forms a more secure bond than typical hook and loop fasteners.

Each of the first 12 and second 14 panels may further include a middle layer 30 positioned between associated ones of the upper 26 and lower 28 layers. The middle layer 30 of the first 12 and second 14 panels comprise a stiffening material to retain the first 12 and second 14 panels in a planar configuration. The middle layer 30 may include a plastic material.

Each of the first 12 and second 14 panels has a first side 16 having an arcuate outer edge. More particularly, the first 12 and second 14 panels may be disc shaped such that the first side 16 of the first 12 and second 14 panels are circular. This shape prevents the catching of the assembly 10 on aquatic plants while also providing for destabilized movement through water causing the assembly 10 to rotate quickly and appear to "flash" as light is reflected off of the first sides 12.

In use, the first 12 and second 14 panels are coupled to each other on the leader 24 such that the first 12 and second 16 panels rotate and reflect light as the leader 24 is pulled through water. This will attract fish to the lure. The first sides 16 may come in a plurality of colors and the first and second panels may have diameters between 1.0 cm and 8.0 cm. Since the assembly 10 is modular, a person can modify their lure as needed with first 12 and second 14 panels of the same color or first 12 and second 14 panels having different colors with respect to each other. The assembly 10 can be removed from the leader 24 when it is not being used or is being replaced.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A modular fishing lure component assembly configured to be removably positioned on a fishing leader, said assembly including:
   a first panel and a second panel, each of said first and second panels having a first side, a second side and a perimeter edge extending between associated ones of said first and second sides, said first side of each of said first and second panels comprising a light reflective material, said first and second panels each including an upper layer including said first side and a lower layer including said second side;
   said lower layer of said first panel comprising a first mating member and said lower layer of said second panel comprising a second mating member, said first and second mating members being configured to be removably coupled together with a leader positioned between said first and second panels to releasably retain said first and second panels on the leader; and
   wherein said first and second panels are coupled to each other on the leader such that said first and second panels rotate and reflect light as the leader is pulled through water.

2. The assembly according to claim 1, wherein said second sides of said first and second panels entirely comprise a corresponding one of said first or second mating members such that said second sides are joinable along said perimeter edges.

3. The assembly according to claim 1, wherein said upper layer of said first and second panels each comprises a reflective tape.

4. The assembly according to claim 3, wherein each of said first and second panels includes a middle layer positioned between associated ones of said upper and lower layers, said middle layer of said first and second panels comprising a stiffening material to retain said first and second panels in a planar configuration.

5. The assembly according to claim 1, wherein each of said first and second panels has a first side having an arcuate outer edge.

6. The assembly according to claim 1, wherein said first and second panels are disc shaped such that said first sides of said first and second panels are circular.

7. A modular fishing lure component assembly configured to be removably positioned on a fishing leader, said assembly including:
   a first panel and a second panel, each of said first and second panels having a first side, a second side and a perimeter edge extending between associated ones of said first and second sides, said first side of each of said first and second panels comprising a light reflective material, said first and second panels each including an upper layer including said first side and a lower layer including said second side;
   said lower layer of said first panel comprising a first mating member and said lower layer of said second panel comprising a second mating member, said first and second mating members being configured to be removably coupled together with a leader positioned between said first and second panels to releasably retain said first and second panels on the leader, said second sides of said first and second panels entirely comprising a corresponding one of said first or second mating members such that said second sides are joinable along said perimeter edges;
   said upper layer of said first and second panels each comprising a reflective tape;
   each of said first and second panels including a middle layer positioned between associated ones of said upper and lower layers, said middle layer of said first and second panels comprising a stiffening material to retain said first and second panels in a planar configuration;
   each of said first and second panels having a first side having an arcuate outer edge, said first and second panels being disc shaped such that said first side of said first and second panels are circular; and
   wherein said first and second panels are coupled to each other on the leader such that said first and second panels rotate and reflect light as the leader is pulled through water.

* * * * *